United States Patent [19]

König et al.

[11] 4,252,923

[45] Feb. 24, 1981

[54] LACQUER-GRADE POLYISOCYANATE BASED ON MODIFIED 1-ISOCYANATO-3,3,5-TRIMETHYL-5-ISOCYANATOMETHYL CYCLOHEXANE, A PROCESS FOR ITS PRODUCTION AND ITS USE IN TWO-COMPONENT POLYURETHANE POWDER LACQUERS

[75] Inventors: Eberhard König, Kronberg; Hans J. Kreuder, Krefeld; Peter Breidenbach; Josef Pedain, both of Cologne, all of Fed. Rep. of Germany

[73] Assignee: Bayer Aktiengesellschaft, Leverkusen, Fed. Rep. of Germany

[21] Appl. No.: 76,026

[22] Filed: Sep. 17, 1979

[30] Foreign Application Priority Data

Sep. 29, 1978 [DE] Fed. Rep. of Germany ....... 2842641

[51] Int. Cl.$^3$ ............................................. C08G 18/80
[52] U.S. Cl. ...................... 525/452; 427/13; 427/27; 428/422.8; 427/385 R; 528/45
[58] Field of Search .................. 528/45; 427/13, 27, 427/385 R; 525/452, 453; 428/422.8

[56] References Cited

U.S. PATENT DOCUMENTS

| | | | |
|---|---|---|---|
| 3,583,943 | 6/1971 | Weber et al. ........................... | 528/45 |
| 3,819,586 | 6/1974 | Rudolph et al. ................. | 260/18 TN |
| 3,822,240 | 7/1974 | Schmitt et al. ......................... | 528/45 |
| 3,849,160 | 11/1974 | Dhein et al. ........................... | 528/45 |
| 3,947,426 | 3/1976 | Lander .................................... | 528/45 |
| 3,954,719 | 5/1976 | Pirck et al. ............................. | 427/27 |
| 4,055,550 | 10/1977 | Panandiker et al. ................... | 528/45 |
| 4,124,545 | 11/1978 | Hocker et al. ......................... | 528/45 |
| 4,150,211 | 4/1979 | Müller et al. .......................... | 528/45 |

FOREIGN PATENT DOCUMENTS 2246620 3/1974 Fed. Rep. of Germany .
2644684 10/1976 Fed. Rep. of Germany .
1450414 9/1976 United Kingdom .

*Primary Examiner*—Maurice J. Welsh
*Attorney, Agent, or Firm*—Gene Harsh; Lawrence S. Pope; Thomas W. Roy

[57] ABSTRACT

A novel isocyanate adduct is disclosed which is suitable for use in two-component polyurethane powder coating compositions and which comprises a partially trimerized, partially blocked isophorone diisocyanate which retains some free isocyanate groups. These adducts are resistant to yellowing on exposure to high stoving temperatures and have softening temperature low enough to permit ready incorporation into powder coating compositions. Also disclosed is a process for synthesizing this adduct and a process of using it in powder coating a substrate.

9 Claims, No Drawings

LACQUER-GRADE POLYISOCYANATE BASED ON MODIFIED 1-ISOCYANATO-3,3,5-TRIMETHYL-5-ISOCYANATOMETHYL CYCLOHEXANE, A PROCESS FOR ITS PRODUCTION AND ITS USE IN TWO-COMPONENT POLYURETHANE POWDER LACQUERS

FIELD OF THE INVENTION

This invention relates to a new modified solid lacquer-grade isocyanate based on 1-isocyanato-3,3,5-trimethyl-5-isocyanatomethyl cyclohexane (isophorone diisocyanate, in short: IPDI) containing isocyanurate groups, blocked isocyanate groups and free isocyanate groups, to a process for its production by partial trimerization of the isocyanate groups in IPDI, followed by partial blocking of the remaining isocyanate groups, and to the use of the new modified polyisocyanate as a crosslinking agent in two-component polyurethane powder lacquers.

BACKGROUND OF THE INVENTION

Powder lacquers based on polyurethanes are known. The binders used are divided into two groups, namely two-component binders (for example, German Auslegeschrift No. 1,957,483; U.S. Pat. No. 3,849,160; German Offenlegungsschrift No. 2,105,777 and U.S. Pat. No. 3,822,240) and one-component binders (German Offenlegungsschrift Nos. 2,047,718; 2,246,620 and 2,429,517; U.S. Pat. No. 3,819,586; British Pat. No. 1,450,414; German Auslegeschrift No. 2,351,477 and U.S. Pat. No. 3,954,719). Although aliphatic diisocyanates are at least partly used in the processes described in these literature references, the color stability of these known systems is, in many cases, still unsatisfactory. In particular, the binders based on hexamethylene diisocyanate which are described in German Offenlegungsschrift No. 2,047,718; U.S. Pat. No. 3,819,586; German Auslegeschrift No. 2,351,477 and U.S. Pat. No. 3,954,719, the binders based on tolylene diisocyanate which are described in German Offenlegungsschrift No. 2,429,517 and British Pat. No. 1,450,414 and the binders based on IPDI or IPDI/trimethylol propane adducts which are described in German Offenlegungsschrift Nos. 2,246,620 and 2,105,777 and U.S. Pat. No. 3,822,240, all show a pronounced tendency towards yellowing in the event of overstoving despite the aliphatic character of the isocyanate component (except in the case of the systems according to German Offenlegungsschrift No. 2,429,517 and British Pat. No. 1,450,414). In contrast, polyurethane lacquers based on IPDI trimers, of the type described, for example, in German Offenlegungsschrift No. 2,644,684 or in German patent application No. P 28 06 731.4 and U.S. patent application Ser. No. 011,465 filed Feb. 12, 1979, are known to be particularly inert to chemical and physical influences and to give lacquers which are superior in their color stability under heat to the lacquers described in the above-mentioned literature references. The IPDI trimers which have just been mentioned, however, are resins having a relatively high softening temperature in the order of 105° C. Accordingly, considerable technical difficulties are involved in converting these high-melting resins to suitable powder lacquer hardness by blocking, for example with ε-caprolactam. In addition, the softening temperature of the blocked resin is considerably beyond the upper limit required for optimal levelling of powder-form binders, i.e. from around 120° to 130° C.

Accordingly, the object of the present invention is to provide new polyisocyanates suitable for use as crosslinking agents for polyurethane powder lacquers which do not have any of the disadvantages referred to above.

According to the present invention, this object is achieved by the modified polyisocyanates based on IPDI which are described in detail hereinafter.

SUMMARY OF THE INVENTION

The present invention relates to a lacquer-grade polyisocyanate based on modified 1-isocyanato-3,3,5-trimethyl-5-isocyanatomethyl cyclohexane, characterized by a content, based on the weight excluding the weight of the blocking agent, (a) of from about 5.7 to 17.0% by weight of trimerized isocyanate groups in the form of isocyanurate groups, (b) of from about 10.4 to 29.0% by weight of isocyanate groups blocked with blocking agents known per se and (c) of from about 2.1 to 16.0% by weight of free isocyanate groups.

The present invention also relates to a process for producing this new modified polyisocyanate which is characterized in that, in a first reaction step, from about 5.7 to 17.0% by weight of the total of 37.8% by weight of isocyanate groups in the 1-isocyanato-3,3,5-trimethyl-5-isocyanatomethyl cyclohexane are converted into isocyanurate groups by catalytic trimerization known per se and, in a second reaction step, another about 10.4 to 29.0% by weight of the toal of 37.8% by weight of isocyanate groups present in the starting diisocyanate are blocked by the addition of a corresponding quantity of a blocking agent known per se so that, of the original 37.8% by weight, at least about 2.1% by weight of free isocyanate groups based on the total weight excluding the weight of the blocking agent, are still present.

Finally, the present invention also relates to the use of the new modified polyisocyanates as isocyanate component in heat-crosslinkable two-component polyurethane powder lacquers.

DETAILED DESCRIPTION OF THE INVENTION

The first stage of the process according to the present invention comprises trimerizing some of the isocyanate groups of the IPDI. Trimerization is carried out by a known method using trimerization catalysts known per se, for example, phosphines, alkali phenolates, mixtures of N,N'-endoethylene piperazine and propylene oxide of the type described, for example, in German Offenlegungsschrift No. 1,934,763, in British Pat. Nos. 1,392,066 and 1,386,399 or in German Offenlegungsschrift No. 2,644,684. Particularly preferred catalysts are the quaternary ammonium hydroxides containing at least one hydroxyalkyl group according to German patent application No. P 28 06 731.4, for example, 2-hydroxyethyl-trimethyl ammonium hydroxide.

In order for the trimerization catalysts to be suitable for the purposes of the present invention it must be possible to deactivate them, for example, using a catalyst poison or by the action of heat. The catalysts according to German patent application No. P 28 06 731.4 have the advantage that they develop their activity immediately, i.e. without an incubation period. At the same time, these catalysts begin to undergo thermal decomposition at the temperature at which trimerization takes place so that, for a predetermined starting temperature, the degree of trimerization can be simply controlled through the quantity of catalyst added. In cases where thermally stable catalysts are used, the trimerization reaction has to be terminated on reaching the required degree of trimerization (percentage of the trimerized isocyanate groups, based on the total quantity of isocyanate groups originally present) by the addition of a suitable catalyst poison.

In the first stage of the process according to the present invention, the trimerization reaction is terminated at an NCO-content of the reaction mixture (based on the isocyanate component) of from about 32.1 to 20.8%, preferably at an NCO-content of from about 28.35 to 24.6% by weight. In practice, it is possible, for example, to heat IPDI in a reactor to a temperature of from about 40° to 70° C. and to introduce the catalyst (for example, a solution of 2-hydroxyethyl trimethyl ammonium hydroxide according to the following examples) at such a rate that the temperature remains between about 80° and 90° C. The NCO-content decreases continuously starting from the initial level of 37.8% by weight. The degree of trimerization may be adjusted either by using the catalyst in a quantity which has been calculated in advance or determined in a preliminary test or even by adding a catalyst poison, such as perfluorobutane sulphonic acid.

After this partial trimerization of the isocyanate groups in the starting diisocyanate, more of the isocyanate groups are blocked in the second stage of the process according to the present invention by the addition of a blocking agent at a temperature of, for example, from about 100° to 130° C. The quantity in which the blocking agent is used is gauged in such a way that from about 0.55 to 1.53 and preferably from about 0.6 to 1.1 equivalents of the blocking agent are available per mole of IPDI used as a starting material, the degree of trimerization and blocking preferably being selected in such a way that at least about 0.11, preferably about 0.2, and at most about 0.85, preferably at most about 0.7, equivalents of free isocyanate groups are present per mole of starting diisocyanate.

Suitable blocking agents are, for example, phenols, such as phenol, the isomeric cresols, methylethyl ketoxime, cyclohexanone oxime, alcohols such as methanol, tert.-butanol or cyclohexanol, malonic acid diethyl ester, acetoacetic acid ethyl ester, the various isomeric triazoles and, in particular, $\epsilon$-caprolactam.

Both stages of the process according to the present invention are preferably carried out in the absence of solvents apart from the small quantities of solvent optionally used for the catalyst solutions.

In the production of the partially blocked polyisocyanates, it is best to follow the sequence indicated above, i.e. to carry out the cyclopolymerization reaction in the first stage, followed by blocking in the second stage of the reaction. The advantage of this procedure is that the first reaction step may be carried out in a low viscosity range so that the more sensitive trimerization reaction can be better controlled. In principle, however, it would also be possible to carry out the above-mentioned reaction steps in the opposite sequence.

Accordingly, the end products according to the present invention still contain excess free isocyanate groups, blocked isocyanate groups and isocyanurate groups. Per mole of starting diisocyanate, the end products contain from about 0.3 to 0.9, preferably from about 0.5 to 0.7 equivalents of isocyanate groups in trimerized form, from about 0.55 to 1.53, preferably from about 0.6 to 1.1 equivalents of isocyanate groups in blocked form and from about 0.11 to 0.85, preferably from about 0.2 to 0.7 equivalents of isocyanate groups in free form, so that the sum of equivalents of trimerized isocyanate groups and blocked isocyanate groups preferably amounts to at least about 1.3. This corresponds to a content of from about 5.7 to 17.0% by weight, preferably from about 9.45 to 13.2% by weight of isocyanate groups in trimerized form, to a content of from about 10.4 to 29.0% by weight, preferably from about 11.3 to 20.8% by weight of isocyanate groups in blocked form and to a content of free isocyanate groups of from about 2.1 to 16.0% by weight, preferably from about 3.8 to 13.2% by weight, based on the weight of the modified polyisocyanate excluding the weight of the blocking agent present. If the blocking agent is included in the calculation of the percentages, the products according to the invention generally contain from about 4.4 to 9.5% by weight of trimerized NCO-groups, from about 8.0 to 16.3% by weight of blocked NCO-groups and from about 1.6 to 9.0% by weight of free NCO-groups.

The products according to the present invention are solid compounds which are stable at room temperature and which have only a low content of blocked isocyanates.

By suitably selecting both the degree of trimerization and the degree of blocking within the above-mentioned limits and also by suitably selecting the blocking agent, it is also possible to adjust the optimum melting range and, in addition, to influence the levelling properties and gloss of the lacquer where the products according to the invention are used in accordance with the present invention.

Despite their often high content of free isocyanate groups, the products according to the invention are eminently suitable for use as crosslinking agents in powder lacquers. In the conventional production of powder lacquer binders, the NCO-groups responsible for crosslinking are only used in completely blocked form in order to avoid the danger of premature hardening whether during storage or during homogeneous admixture with, for example, OH-containing resins, pigments, etc., in an extruder at temperatures of from about 100° to 120° C. It was therefore surprising to find, and could not have been foreseen, that the hardeners according to the present invention could be processed to form storable lacquer powders ready for use.

Where they are used as hardeners for powder lacquers, the products according to the present invention are combined with the usual resins for polyurethane-based powder lacquers, i.e. preferably with resins containing hydroxyl groups.

Suitable hydroxyl-group-containing resins are those which have softening temperatures, as determined by differential thermoanalysis (DTA), of from about 40° to 140° C., preferably from about 45° to 100° C., hydroxyl numbers of from about 30 to 200, preferably from about 40 to 130 and an average molecular weight of from about 400 to 10,000, preferably from about 1000 to 5000.

The following are examples of hydroxyl-group-containing resins such as these:

1. Hydroxyl-group-containing polyesters obtained in the conventional way from aromatic or aliphatic or cycloaliphatic glycols or polyols, preferably from aliphatic or cycloaliphatic glycols by virtue of the better chalking and weather resistance, and polycarboxylic acids or their functional derivatives (esters, acid chlorides, etc.), cf. Houben-Weyl, XIV/2, pages 1-46. Suitable glycols are, for example, ethylene glycol, 1,2-propane diol, 1,4-butane diol and their isomers, neopentyl glycol, 1,6-hexane diol and their isomers, 4,4'-dihydroxy dicyclohexyl-2,2-propane and cyclohexane diol. Suitable polyols are, for example, trimethylol propane and hexane triol. Suitable polycarboxylic acids are, for example, tetrahydrophthalic acid, terephthalic acid, phthalic acid, isophthalic acid and trimellitic acid. It is particularly preferred to use hydroxyl-group-containing polyesters synthesized from about 50 to 65% by weight of aromatic polycarboxylic acids, 30 to 45% by weight of aliphatic glycols and around 5% by weight of aliphatic triols.

2. Hydroxyl-group-containing copolymers of the type obtained by copolymerizing hydroxyalkyl(meth)acrylates, for example, with acrylic or methacrylic acid alkyl esters and, optionally, other olefinically unsaturated monomers and/or of the type obtained from styrene/maleic acid copolymers in accordance with German Offenlegungsschrift No. 2,137,239 by partially esterifying the acid groups with ethylene oxide.

To produce the lacquer powders in the form in which they are ready for use, the hydroxyl-group-containing resin and the lacquer-grade polyisocyanate according to the present invention are mixed, optionally blended with pigments, such as titanium dioxide, levelling agents, such as polybutyl acrylate or silicone compounds, and other standard additives and mixed in the melt in extruders or kneaders at temperatures of from about 100° to 120° C. to form a homogeneous material. The solid material obtained is ground and freed by sieving from grain fractions larger than 0.1 mm in diameter. The hydroxyl-group-containing resins and the products according to the present invention are used in such quantitative ratios that, in all, from about 0.6 to 1.2, preferably from about 0.8 to 1.0 free or blocked isocyanate groups are available for each hydroxyl group of the hydroxyl-group-containing resin.

The powder lacquers thus produced may be applied to the shaped articles to be coated by standard powder coating processes, such as electrostatic powder spraying or fluidization dip coating. The coatings are hardened by heating to temperatures of from about 150° to 220° C., preferably to temperatures of from about 170° to 190° C. Hard, glossy and elastic coatings have excellent anti-corrosion properties and very good color stability under heat are obtained. By comparision with completely blocked binders, the powder lacquers produced in accordance with the invention may be hardened at a lower stoving temperature.

In the following Examples, all the percentages quoted, except for the gloss values, represent % by weight.

PREPARATION OF THE 2-HYDROXYETHYLTRIMETHYL AMMONIUM HYDROXIDE CATALYST SOLUTION 44 g (1 mole) of ethylene oxide are introduced with stirring into a mixture of 59 g (1 mole) of trimethylamine, 50 g of water and 50 g of methanol, the temperature being kept at 50° C. during the reaction. The dark colored solution of the reaction product is then diluted with 827 g of dimethyl formamide, corresponding to a 10% solution, and is then ready for use.

PRODUCTION OF POLYISOCYANATE HARDENERS ACCORDING TO THE INVENTION (EXAMPLES 1 TO 3)

EXAMPLE 1

2664 g (12 moles) of 3-isocyanato-3,3,5-trimethyl-5-isocyanatomethyl cyclohexane (IPDI) are initially introduced at 60° C. Approximately 20 ml of the catalyst solution described above are added in two portions with stirring, producing an immediate increase in temperature. An internal temperature of from 80° to 90° C. is maintained, optionally by cooling, until after about 30 to 40 minutes the NCO-content has fallen to 27.5%. A mixture of 1 ml of perfluorobutane sulphonic acid in 2 ml of dimethyl formamide is then stirred in to neutralize the basic catalyst. The polyisocyanate mixture, which contains approximately 55% by weight of cyclopolymerized IPDI, corresponding to a conversion of 0.55 equivalents of isocyanate groups per mole of IPDI used, and which has a viscosity of approximately 60,000 mPas at 20° C., may be stored or further processed as described below.

The temperature is increased to 90°-100° C. and 985 g (8.7 moles) of molten ε-caprolactam are run in with stirring. The exothermic blocking reaction increases the temperature of the mixture to 120°-130° C. To complete the reaction, the mixture is stirred for 30 minutes at 130° C. after which the melt is poured out. The solidified resin has a glass transition temperature of 47° C. and of its NCO-groups still available for the crosslinking reaction, about 50% are blocked and approximately 50% are present in free form. The analytically determined content of blocked NCO-groups (expressed as NCO) in the modified IPDI amounts to 10% and the content of free NCO-groups to 8.5%, so that the NCO-equivalent weight, including the weight of the blocking agent, works out to 227 g. Of the 37.8% of NCO-groups of the IPDI originally used, 10.3% are present in the described product in trimerized form, 13.7% in blocked form and 11.8% in free form. The remaining NCO-groups (2%) have reacted off through allophanate formation.

EXAMPLE 2

2664 g (12 moles) of IPDI are trimerized as described in Example 1 to an NCO-content of approximately 27.5%. The trimerization catalyst is then deactivated by heating for 15 minutes to 120° C. 70% of the NCO-groups still present are then blocked by the addition of 1380 g (12.2 moles) of ε-caprolactam as described in Example 1. The solidified resin has a glass transition temperature of 52° C., an analytically determined content of blocked NCO-groups (expressed as NCO) of 12.6% and a content of free NCO-groups of 5.4%, giving an NCO-equivalent weight, including the weight of the blocking agent, of 233 g. This lacquer-grade polyisocyanate contains 10.3% of NCO-groups in trimerized form, 19.2% of NCO-groups in blocked form and 8.2% of NCO-groups in free form, based on the weight excluding the weight of the blocking agent.

EXAMPLE 3

2664 g (12 moles) of IPDI are reacted as described in Example 1 to an NCO-content of approximately 24.6%. This NCO-content corresponds to the cyclopolymerization of 0.7 equivalents of NCO-groups per mole of IPDI. This polyisocyanate mixture has a viscosity of 130,000 mPas at 20° C. 900 g (8 moles) of ε-caprolactam are run in with stirring at 100° C., corresponding to a blocking level of approximately 50% of the NCO-groups still present. The internal temperature is increased to 140° C. and the reaction carried out at this temperature over a period of 20 minutes. The melt is poured out and the solidified resin is size-reduced. The hardener has a glass transition temperature of 50° C., an analytically determined content of blocked NCO-groups of 9.1%, a content of free NCO-groups of 8.6% and, hence, an NCO-equivalent weight, including the weight of the blocking agent, of 237 g.

Of the 37.8% of NCO-groups originally used, 13.2% are present in this lacquer-grade polyisocyanate in trimerized form, 11.8% in blocked form and 11.2% in free form. The missing NCO-groups (1.6% by weight) have obviously reacted off through allophanate formation.

APPLICATION EXAMPLES (EXAMPLES 4 TO 7)

EXAMPLE 4

49.5 parts by weight of a hydroxyl-group-containing polyester based on terephthalic acid, neopentyl glycol, 1,6-hexane diol and trimethylol propane (OH-number 50, OH-equivalent weight 1120), 10.0 parts by weight of the hardener according to Example 1, 39.9 parts by weight of a standard commercial-grade titanium pigment (rutile) and 0.6 parts by weight of a standard commercial-grade acrylate-based levelling agent, are melted at around 120° C. and homogenized in an extruder. The polyhydroxide polyester and the hardener are used in the ratio of their equivalent weights. After the melt has solidified, the product is ground. The lacquer powder has a glass transition temperature of 53° C. The 0.02–0.1 mm grain fraction is applied to test plates by electrostatic spraying and hardened for 15 minutes at 180° C. in a stoving oven. The lacquer has the following properties:

| | |
|---|---|
| Erichsen indentation (DIN 53 156) | >10 mm |
| Erichsen indentation after ageing for 3 days at 70° C. | 10 mm |
| Gloss, 60° reflection angle (ASTM D 523) | 91% |
| Conical mandrel bending test (ASTM 522) | 35% |
| Step mandrel bending test (DIN 53 152) | 2 mm |
| Lattice cut (DIN 53 151) | GTO. |

The resistance of this lacquer to overstoving is demonstrated by the following test series:

| Heat treatment | | | | | |
|---|---|---|---|---|---|
| Duration | 10' | 15' | 30' | 10' | 20' |
| Temperature | 200° C. | 200° C. | 200° C. | 220° C. | 220° C. |
| Whiteness according to A. Berger | 81,9 | 80,8 | 79,8 | 79,0 | 78,0 |

The whiteness according to A. Berger was determined according to the method described in "Die Farbe" vol. 8, (December 1959) pages 187–202.

EXAMPLE 5

49.3 parts by weight of the hydroxyl-group-containing polyester of Example 4, 10.2 parts by weight of the hardener of Example 2, 39.9 parts by weight of the titanium pigment of Example 4 and 0.6 parts by weight of the levelling agent of Example 4 are processed to form a powder lacquer in the same way as described in Example 4. The binder components are added in the ratio of their equivalent weights. After stoving for 10 minutes at 200° C., the test lacquers show excellent edge coverage and a completely fault-free surface for a layer thickness of approximately 0.07 mm. They are characterized by the following properties:

| | |
|---|---|
| Erichsen indentation | >10 mm |
| Gloss 60° | 92% |
| Whiteness according to A. Berger | 82.5 |
| Conical mandrel bending test | 35% |
| Step mandrel bending test | 2 mm |
| Lattice cut | GTO. |

EXAMPLE 6

49.1 parts by weight of the hydroxyl-group-containing polyester of Example 4, 10.4 parts by weight of the hardener of Example 3, 39.9 parts by weight of the titanium pigment of Example 4 and 0.6 parts by weight of the levelling agent of Example 4 are processed to form a powder lacquer. The binder components are used in the ratio of their equivalent weights. The coated test plates are stoved both for 10 minutes at 200° C. and also for 30 minutes at 160° C. The following lacquer properties are measured:

| | |
|---|---|
| Erichsen indentation | 10 mm |
| Gloss 60° | 91–92% |
| Whiteness according to A. Berger | 84–86 Elrepho units |
| Conical mandrel bending test | 35% |
| Step mandrel bending test | 2 mm |
| Lattice cut | GTO. |

EXAMPLE 7

52.7 parts by weight of the hydroxyl-group-containing polyester of Example 4, 6.8 parts by weight of the hardener according to Example 3, 39.9 parts by weight of the titanium pigment of Example 4 and 0.6 parts by weight of the levelling agent of Example 4 are processed to form a powder lacquer in the same way as described in Example 4. The binder components are used in an OH/NCO-equivalent ratio of 1/0.6, corresponding to undercrosslinking. After stoving for 10 minutes at 200° C., the coated test plates have the following lacquer properties:

| | |
|---|---|
| Erichsen indentation | 10 mm |
| Gloss 60° | 91.5% |
| Whiteness according to A. Berger | 85.5 |
| Lattice cut | GTO |
| Salt spray test, 500 hours (DIN 53 167) | normal |
| Condensed moisture test, 100 hours (DIN 50 017A) | normal |
| Abrasion resistance (Tabor-Abraisor CS 10-block, 1000 rpm) | 60 mg abrasion. |

The powder lacquers described in Examples 4 to 7 retain their free-flow properties over a period of 4 weeks at a temperature of from 45° to 50° C. They do not lose the described service and film properties when stored at room temperature for a period of 6 months.

What is claimed is:

1. A lacquer grade polyisocyanate produced by modifying the following diisocyanate, 1-isocyanato-3,3,5-trimethyl-5-isocyanatomethyl cyclohexane, so that
   (a) about 15 to 45% of the isocyanate groups of said diisocyanate are in the form of isocyanurate groups;
   (b) about 27.5 to 76.5% of the isocyanate groups of said diisocyanate are blocked with a blocking agent; and
   (c) about 5.5 to 42.5% of the isocyanate groups of said diisocyanate remain unreacted.

2. A process for producing a lacquer-grade polyisocyanate which comprises:
   (a) catalytically trimerizing about 15 to 45% of the isocyanate groups present in 1-isocyanato-3,3,5-trimethyl-5-isocyanatomethyl cyclohexane to form isocyanurate groups; and
   (b) reacting the product of step (a) with sufficient quantities of a blocking agent to block about 27.5 to 76.5% of the total number of isocyanate groups initially present in 1-isocyanato-3,3,5-trimethyl-5-isocyanatomethyl cyclohexane while maintaining a free isocyanate group content of at least 5.5% based on the total number of isocyanate groups initially present in 1-isocyanto-3,3,5-trimethyl-5-isocyanatomethyl cyclohexane.

3. In a process for the preparation of heat-cross-linkable two-component polyurethane powder lacquers, the improvement comprising the use of the lacquer-grade polyisocyanate of claim 1 as the isocyanate component.

4. A process of powder coating a substrate comprising
   (a) mixing the lacquer-grade polyisocyanate of claim 1 with a hydroxyl group containing resin so as to provide about 0.6 to 1.2 free and blocked isocyanate groups per hydroxyl group, said resin having a softening temperature of between about 40° and 140° C., and a hydroxyl number of between about 30 and 200 and a molecular weight ($\overline{M}n$) of between 400 and 10,000,
   (b) forming a homogeneous melt by the application of shear forces at elevated temperature,
   (c) allowing the melt to solidify and grinding this product to produce grain fractions less than about 0.1 mm in diameter,
   (d) applying the powder so obtained to the substrate, and
   (e) curing the coating by subjecting it to a temperature between about 150° and 220° C.

5. The process of claim 4, wherein the powder is applied to a shaped article by electrostatic powder spraying.

6. The process of claim 4, wherein the powder is applied by immersing a shaped article into a fluidized bed of said powder.

7. The process of claim 4, wherein the curing temperature is less than that necessary for the same composition in which all the isocyanate groups of the trimerized isocyanate were blocked before combination with the hydroxyl bearing resin.

8. A process for preparing a powder coating composition comprising
   (a) mixing the lacquer-grade polyisocyanate of claim 1 with a hydroxyl group containing resin so as to provide about 0.6 to 1.2 free and blocked isocyanate groups per hydroxyl group, said resin having a softening temperature of between about 40° and 140° C., and a hydroxyl number of between about 30 and 200 and a molecular weight ($\overline{M}n$) of between 400 and 10,000,
   (b) forming a homogeneous melt by the application of shear forces at elevated temperature, and
   (c) allowing the melt to solidify and grinding this product to produce grain fractions less than about 0.1 mm in diameter.

9. The powder coating composition obtained from the process of claim 8.